United States Patent [19]

Hui et al.

[11] Patent Number: 5,114,999

[45] Date of Patent: May 19, 1992

[54] GLYOXAL-CONTAINING BINDER INSOLUBILIZER

[75] Inventors: Sai H. Hui, Hudson; W. Bruce Darlington, Wadsworth, both of Ohio

[73] Assignee: PPG Industries, Inc., Pittsburgh, Pa.

[21] Appl. No.: 333,353

[22] Filed: Apr. 3, 1989

[51] Int. Cl.⁵ .................. C08K 5/07; C08L 61/00; C08G 89/00; B32B 23/08

[52] U.S. Cl. ..................... 524/47; 524/512; 525/154; 525/155; 527/306; 527/309; 428/511; 428/534; 428/537.5

[58] Field of Search .............. 524/47, 425, 445, 446, 524/503, 512; 525/57, 58, 154, 155, 160, 161; 527/201, 205, 306, 309; 428/507, 511, 514, 526, 534, 537.5

[56] References Cited

U.S. PATENT DOCUMENTS

| | | | |
|---|---|---|---|
| 4,455,416 | 6/1984 | Floyd et al. | 528/245 |
| 4,471,087 | 9/1984 | Lipowski | 524/512 |
| 4,537,634 | 8/1985 | Floyd | 106/214 |
| 4,837,087 | 6/1989 | Floyd et al. | 524/425 |

Primary Examiner—Nathan M. Nutter
Attorney, Agent, or Firm—Edward J. Whitfield; Irwin M. Stein

[57] ABSTRACT

Disclosed is a binder insolubilizer for use in binder-containing paper coating compositions, the insolubilizer consisting essentially of an aqueous formulation containing at least about 15 weight percent of titratable glyoxal and at least one polyhydroxy compound.

3 Claims, No Drawings

GLYOXAL-CONTAINING BINDER INSOLUBILIZER

FIELD OF THE INVENTION

This invention relates to glyoxal-containing binder insolubilizer for use in paper coating compositions.

BACKGROUND OF THE INVENTION

Paper coating compositions typically contain binders, pigments, lubricants, defoamers, bactericides, fungicides and other additives depending on the desired end product. Starches such as natural starches, oxidized starches, enzyme converted starches or the like typically comprise the binder component which functions to bind the pigment particles together and to bind the coating layer to the raw stock. Other commonly used binders include proteins such as casein, water soluble polyvinyl alcohols, polyacrylamides, styrene-butadiene resins or the like. Where water penetration resistance is a prime requirement, an insolubilizer is added to the coating composition to crosslink the binder.

Glyoxal, a highly reactive dialdehyde, has been demonstrated to be an excellent binder insolubilizing agent. However, glyoxal is so reactive that it cannot be used as such and must be blocked to moderate its reactivity as described, for example, in U.S. Pat. Nos. 4,471,087 and 4,455,416. The '087 patent discloses an oligomer of glyoxal and urea and the '416 patent discloses a condensation product of glyoxal, cyclic urea and polyol.

Other glyoxal-urea reaction products said to be useful as binder insolubilizing agents are described in U.S. Pat. Nos. 3,869,296; 3,917,659; and 4,343,655.

DESCRIPTION OF THE INVENTION

This invention provides a urea-free, glyoxal-containing binder insolubilizer for use in paper coating compositions. More particularly, the binder insolubilizer of this invention consists essentially of an aqueous formulation containing from about 20 and up to about 35 weight percent of titratable glyoxal and at least one polyhydroxy compound, preferably at least about one equivalent of polyhydroxy compound being present for each equivalent of titratable glyoxal.

The term "titratable glyoxal" as used herein means glyoxal that undergoes oximation by hydroxylamine hydrochloride in the presence of excess triethanolamine. A number of assay methods exist for determining the amount of titratable glyoxal present in a sample, e.g., direct or indirect titration methods. One such method, as described in detail in Example I, involves titration of unreacted triethanolamine with standardized hydrochloric acid using bromophenol blue indicator, the difference between this value and a blank value permitting calculation of the amount of titratable glyoxal. Determination of the end point by potentiometric means is preferred since the same eliminates the subjectivity inherent in determining the visual indicator end point.

Polyhydroxy compounds suitable for use in accordance with this invention may be selected from a broad variety of materials such as, e.g., ethylene glycol, 1,2-propylene glycol, 1,3-propylene glycol, 1,2-butylene glycol, 1,3-butylene glycol, 1,4-butylene glycol, polyalkylene glycols of the formula, $HO(RO)_nH$ where R is a $C_2$ to $C_4$ alkylene and n is 2 to 50, such as diethylene glycol and dipropylene glycol or mixtures thereof. Other polyhydroxy compounds include, e.g., glycerine, dextrans, glyoxal monostearate, ascorbic acid, ascorbate, erythrobic acid, sorbic acid, ascorbyl palmitate, alkali and alkaline earth metal sorbates and ascorbates, monoglycerides of edible fats or oils, inositol, alkali metal tartrates, glycerol monocaprate, sorbose monoglyceride citrate, polyvinyl alcohol, sorbitol, dextrose or mixtures thereof.

Starch syrup may also be used, which is typically obtainable as a concentrated aqueous solution of partial hydrolyzates of starch and contains dextrose, maltose and high oligosaccharides derived from starch by acid or enzyme hydrolysis. Although starch syrup derived from corn starch is preferred, starch syrup derived from other plant or vegetable starches may also be used. Starch syrup suitable for use in accordance with this invention typically has a density in the range of from about 41° to about 45° Baume corresponding to a solids content of from about 76 to about 84 weight percent.

The aqueous binder insolubilizer formulation of this invention has a total solids content typically in the range of from about 30 to about 80 weight percent, preferably from about 40 to about 60 weight percent, and is added to the paper coating composition in an amount sufficient to provide from about 0.005 to about 0.20 parts by weight and preferably from about 0.01 to about 0.10 parts by weight of titratable glyoxal per part by weight of binder in the paper coating composition.

The invention is further illustrated but is not intended to be limited by the following Examples.

EXAMPLE I

Analytical Procedure for Determining Titratable Glyoxal

A. Equipment

1. Brinkmann Metrohm Model 536 automatic titrator, or equivalent.
2. Ordinary Combination glass indicator/reference electrode.
3. Magnetic stirrer and stirring bars.
4. 250 mL Erlenmeyer flasks with ground glass stoppers.
5. Volumetric flask, pipets and other miscellaneous glassware.

B. Reagents 1. 2-Propanol, HPLC grade.
2. 0.5N Hydroxylamine hydrochloride: Dissolve 35 g $NH_2OH \cdot HCl$ in 150 mL distilled water and dilute to one liter with 2-propanol.
3. 0.5N Triethanolamine: Dissolve 67 mL triethanolamine in one liter distilled water.
4. Bromophenol blue indicator solution: Dissolve 0.02 g bromophenol blue in 50 mL 2-propanol, in a 100 mL beaker. Stir with a glass stirring rod.
5. 1.0N Hydrochloric acid, standardized against reagent grade $Na_2CO_3$, using the potentiometric end point determination.

C. Analytical Procedure

1. Add 30 mL bromophenol blue indicator to one liter hydroxylamine hydrochloride solution. Mix well and neutralize the acidity of this solution by adding the triethanolamine solution slowly by medicine dropper until the color changes from yellow to light green. This solution should be prepared fresh daily.

2. To each 250 mL Erlenmeyer flask, add 65 mL neutralized 0.5N hydroxylamine hydrochloride solution from a graduated cylinder, and then pipet in 50.00 mL 0.5N triethanolamine solution. The solution will change from green to sapphire blue. Purge the flask with line nitrogen, and stopper. Place the flask on a top loading balance and weigh in sample (refer to Table I), to the nearest 0.01 g. Restopper the flask, swirl contents thoroughly and allow contents to stand for ½ hour at room temperature. Two blank flasks (containing the hydroxylamine hydrochloride and triethanolamine solutions, but no added glyoxal), should also be prepared and analyzed.

3. After the standing period is completed, unstopper the flask, and transfer contents to a 250 mL beaker rinsing with 4 small portions of distilled water from a wash bottle. Insert a stirring bar, place the beaker on a magnetic stirrer, and titrate with 1.0N HCl to the potentiometric end point using an automatic titrator.

TABLE I

| Guide for Sample Weight | |
|---|---|
| Weight Sample (g) | Approx. Glyoxal % |
| 1 | 40 |
| 2 | 25 |
| 3 | 10 |

D. Calculations

1. Calculate the net titration volume by subtracting the volume of HCl used in the sample titration from the volume of HCl used in the blank titration.
2. Calculate % glyoxal in the sample: % glyoxal = (net mL HCl × N HCl × 2.902)/g sample

EXAMPLE II

To a 500 milliliter capacity round bottom flask were charged 180 grams of aqueous 40% glyoxal, 48.6 grams of corn syrup (80.3% solids), 39.0 grams of fragrance grade dipropylene glycol and 32.4 grams of deionized water. The pH was adjusted to 6.0 with sodium bicarbonate and the mixture was heated, with stirring, to 73°–75° C., maintained thereat for 45 minutes and cooled to room temperature. The formulation contained 50 weight percent total solids and 24 weight percent titratable glyoxal as determined by the method described in Example I.

EXAMPLE III

A paper coating composition containing the following ingredients was prepared:

| | |
|---|---|
| #2 Coating Clay | 75 parts |
| TiO$_2$ | 5 parts |
| Delaminated Clay | 20 parts |
| Penford 280 Starch | 10 parts |
| Polysar 456 Latex | 8 parts |
| 50% Calcium Stearate | 0.75 parts |
| Dispex N-40 Fungicide | 0.1 parts |
| Water to about 58 percent by weight total solids. | |

The coating composition was adjusted to pH 8.0 with ammonium hydroxide had the following properties (average of 4 determinations):

| | |
|---|---|
| Percent Solids | 57.99 |
| Brookfield Viscosity: | |
| Cp. @ 20 RPM | 5600 |
| Cp. @ 100 RPM | 1725 |
| Hercules Viscosity: | |
| Cm. @ 4400 RPM | 6.9 |
| Hysteresis, Cm. Increasing | 4.39 |
| Hysteresis, −Cm. Decreasing | 3.46 |
| Apparent Viscosity: | |
| Cp. @ Maximum Shear | 48.10 |
| Hysteresis | 12.85 |
| Adams Wet Rub Rating | 106.4 |
| TAPPI Brightness | 81.69 |
| Hunter "L" Color | 93.87 |
| Hunter "a" Color | −0.87 |
| Hunter "b" Color | 4.08 |

EXAMPLE IV

The insolubilizer formulation prepared as described in Example II was added to the paper coating composition described in Example III to provide 0.048 parts by weight of titratable glyoxal in the insolubilizer formulation per part by weight of starch in the paper coating composition. The resultant composition had the following properties:

| | |
|---|---|
| Percent Solids | 57.99 |
| Brookfield Viscosity: | |
| Cp. @ 20 RPM | 5000 |
| Cp. @ 100 RPM | 1660 |
| Hercules Viscosity: | |
| Cm. @ 4400 RPM | 7.6 |
| Hysteresis, Cm. Increasing | 4.75 |
| Hysteresis, −Cm. Decreasing | 3.75 |
| Apparent Viscosity: | |
| Cp. @ Maximum Shear | 52.79 |
| Hysteresis | 13.89 |
| Adams Wet Rub Rating | 52.2 |
| TAPPI Brightness | 82.84 |
| Hunter "L" Color | 95.13 |
| Hunter "a" Color | −0.72 |
| Hunter "b" Color | 3.83 |

EXAMPLE V

The insolubilizer formulation prepared as described in Example II was added to the paper coating composition prepared as described in Example III to provide 0.096 parts by weight of titratable glyoxal per part by weight of starch in the paper coating composition. The resultant composition had the following properties:

| | |
|---|---|
| Percent Solids | 57.95 |
| Brookfield Viscosity: | |
| Cp. @ 20 RPM | 6600 |
| Cp. @ 100 RPM | 1880 |
| Hercules Viscosity: | |
| Cm. @ 4400 RPM | 7.7 |
| Hysteresis, Cm. Increasing | 4.90 |
| Hysteresis, −Cm. Decreasing | 3.95 |
| Apparent Viscosity: | |
| Cp. @ Maximum Shear | 53.48 |
| Hysteresis | 13.20 |
| Adams Wet Rub Rating | 31.2 |
| TAPPI Brightness | 81.86 |
| Hunter "L" Color | 94.90 |
| Hunter "a" Color | −1.12 |
| Hunter "b" Color | 4.14 |

The binder insolubilizer formulations of the invention when added to paper coatings impart excellent wet rub resistance, stable rheology, rapid off machine curing and improved wet and dry pick to such coatings. Also the insolubilizer formulations of the invention provide all of the benefits of commercially available insolubilizer formulations (e.g., the insolubilizer sold by the Santek business unit of PPG Industries. Inc. under the trademark Curesan TM 199) at as litte as aone half or less or the typically used dosage rate of the commercial material, thus enabling higher coating solids, lower transportation costs and lower storage and material costs. The aforesaid Curesan TM 199 insolubilizer is an aqueous formulation containing about 12 weight percent titratable glyoxal and about 33 weight percent dipropylene glycol.

The paper coatings containing binder insolubilizer formulation of the invention are applied to paper stock by any conventional technique, e.g., blade coating, air knife, side press or the like.

Although the invention has been described in considerable detail by the foregoing it is to be understood that many variations may be made therein by those skilled in the art without departing from the spirit and scope thereof as defined in the appended claims.

We claim:

1. An aqueous binder insolubilizer formulation for use with binder-containing paper coating composition, said formulation consisting essentially of from about 20 to about 35 weight percent of titratable glyoxal and a mixture of:
   (a) polyalkylene glycol selected from diethylene glycol and dipropylene glycol, and
   (b) starch syrup,
the solids content of said formulation being from about 30 to about 80 weight percent.

2. The formulation of claim 1 wherein the solids content of said formulation is from about 40 to about 60 weight percent.

3. The formulation of claim 2 wherein the polyalkylene glycol is dipropylene glycol and the starch syrup is corn syrup.

* * * * *